United States Patent
Kim et al.

(10) Patent No.: US 11,906,744 B2
(45) Date of Patent: Feb. 20, 2024

(54) DISPLAY LENS MANUFACTURING APPARATUS AND METHOD, AND HEAD-MOUNTED DISPLAY DEVICE COMPRISING DISPLAY LENS MANUFACTURED THEREBY

(71) Applicant: LG Chem, Ltd., Seoul (KR)

(72) Inventors: Jae Jin Kim, Daejeon (KR); Byung Mook Kim, Daejeon (KR); Dae Han Seo, Daejeon (KR); Min Soo Song, Daejeon (KR); Bu Gon Shin, Daejeon (KR)

(73) Assignee: LG Chem, Ltd.

( * ) Notice: Subject to any disclaimer, the term of this patent is extended or adjusted under 35 U.S.C. 154(b) by 190 days.

(21) Appl. No.: 17/607,663

(22) PCT Filed: Sep. 23, 2020

(86) PCT No.: PCT/KR2020/012863
§ 371 (c)(1),
(2) Date: Oct. 29, 2021

(87) PCT Pub. No.: WO2021/060828
PCT Pub. Date: Apr. 1, 2021

(65) Prior Publication Data
US 2022/0214549 A1   Jul. 7, 2022

(30) Foreign Application Priority Data
Sep. 27, 2019  (KR) .................. 10-2019-0120075

(51) Int. Cl.
*G02B 27/01*   (2006.01)
*G02B 3/00*   (2006.01)
*G03H 1/00*   (2006.01)

(52) U.S. Cl.
CPC ....... *G02B 27/0172* (2013.01); *G02B 3/0012* (2013.01); *G03H 1/0005* (2013.01); *G02B 2027/0174* (2013.01); *G03H 2260/30* (2013.01)

(58) Field of Classification Search
CPC .............. G02B 27/0172; G02B 3/0012; G02B 2027/0174; G03H 1/0005; G03H 2260/30
See application file for complete search history.

(56) References Cited

U.S. PATENT DOCUMENTS

2004/0100671 A1   5/2004 Kumagai
2006/0285312 A1   12/2006 Ogawa et al.
(Continued)

FOREIGN PATENT DOCUMENTS

JP   H05127022 A   5/1993
JP   H07-013475 A   1/1995
(Continued)

OTHER PUBLICATIONS

Extended European Search Report for Application No. 20870015.3 dated Apr. 20, 2022. 7 pgs.
(Continued)

*Primary Examiner* — Afroza Chowdhury
(74) *Attorney, Agent, or Firm* — Lerner David LLP (57) ABSTRACT

An embodiment according to an aspect of the present disclosure provides a device for manufacturing a display lens, a method for manufacturing a display lens using the device, and a head-mounted display device including the display lens manufactured thereby. The device for manufacturing a display lens including a holographic optical element formed by recording a hologram on a photosensitive substrate, in which a substrate is coated with a photosensitive material, through irradiation of laser beams includes: a first laser light incidence unit configured to cause first laser light,
(Continued)

converging along an irradiation direction, to be incident on one surface of the photosensitive substrate; and a second laser light incidence unit configured to cause second laser light, diverging at a plurality of points along an irradiation direction, to be incident on the other surface of the photosensitive substrate.

11 Claims, 4 Drawing Sheets

(56) References Cited

U.S. PATENT DOCUMENTS

| | | |
|---|---|---|
| 2008/0101196 A1 | 5/2008 | Jeong et al. |
| 2013/0077057 A1* | 3/2013 | Kurashige .......... G03B 21/2033 353/38 |
| 2015/0362734 A1 | 12/2015 | Moser et al. |
| 2016/0033771 A1 | 2/2016 | Tremblay et al. |
| 2017/0299869 A1 | 10/2017 | Urey et al. |
| 2018/0252869 A1 | 9/2018 | Ayres et al. |
| 2019/0041565 A1 | 2/2019 | Masson et al. |

FOREIGN PATENT DOCUMENTS

| | | |
|---|---|---|
| JP | H08-123302 A | 5/1996 |
| JP | H09-185009 A | 7/1997 |
| JP | 2004170524 A | 6/2004 |
| JP | 5526681 B2 | 6/2014 |
| JP | 5561466 B2 | 7/2014 |
| JP | 2014215410 A | 11/2014 |
| JP | 2017194547 A | 10/2017 |
| KR | 100590519 B1 | 6/2006 |
| KR | 20060133484 A | 12/2006 |
| KR | 20080037179 A | 4/2008 |
| KR | 100971465 B1 | 7/2010 |
| KR | 20150136601 A | 12/2015 |
| KR | 20160066942 A | 6/2016 |

OTHER PUBLICATIONS

International Search Report for PCT/KR2020/012863 dated Jan. 15, 2021. 2 pgs.

* cited by examiner

(a) LEFT SIDE  (b) CENTER  (c) RIGHT SIDE

DISPLAY LENS MANUFACTURING APPARATUS AND METHOD, AND HEAD-MOUNTED DISPLAY DEVICE COMPRISING DISPLAY LENS MANUFACTURED THEREBY

CROSS-REFERENCE TO RELATED APPLICATIONS

This application is a national phase entry under 35 U.S.C. § 371 of International Application No. PCT/KR2020/012863, filed on Sep. 23, 2020, published in Korean, which claims priority to Korean Patent Application No. 10-2019-0120075, filed on Sep. 27, 2019, the entire contents of which are hereby incorporated herein by reference.

TECHNICAL FIELD

The present disclosure relates to a device for manufacturing a display lens, a method for manufacturing a display lens, and a head mounted display device manufactured thereby.

BACKGROUND ART

In recent, with a growing interest in a display device that implements augmented reality (AR), mixed reality (MR), or virtual reality (VR), a study of such a display device has been actively conducted. A display unit that implements AR, MR, or VR includes a diffractive light guide plate that uses a diffraction phenomenon based on a wave-like nature of light.

As such a diffractive light guide plate, a type that includes a plurality of diffractive optical elements with a plurality of relief grating patterns and a type that includes a transmission holographic optical element as a photosensitive material having an interference pattern recorded thereon are mainly used.

Meanwhile, in a case of the type that includes the diffractive optical element, color separation efficiency is low, and thus image crosstalk may occur. In a case of the type that includes the diffractive optical element or transmission holographic optical element, a great overall optical loss may be caused.

On the other hand, in a case of a type that includes a reflection holographic optical element, color separation efficiency is high and optical loss is less than that of the diffractive optical element/transmission holographic optical element. However, it is difficult to increase the number of exit pupils that affects the size of an eye box, which is disadvantageous.

Since the above-described background art is technical information possessed by the inventor for deriving embodiments of the present disclosure or acquired in the process of deriving embodiments of the present disclosure, it may not be necessarily said that the background art is a publicly known technique disclosed to the general public before filing the application for the embodiments of the present disclosure.

DISCLOSURE

Technical Problem

Embodiments of the present disclosure intend to provide a device for manufacturing a display lens including a reflection holographic optical element for implementing a plurality of exit pupils, a method for manufacturing the display lens, and a head-mounted display device including the display lens manufactured thereby.

The technical problem of the present disclosure is not limited to the aforementioned problem, and the other unmentioned problems will be clearly understood by those skilled in the art from the following description.

Technical Solution

An embodiment according to an aspect of the present disclosure provides a device for manufacturing a display lens including a holographic optical element formed by recording a hologram on a photosensitive substrate, in which a substrate is coated with a photosensitive material, through irradiation of laser beams, the device including: a first laser light incidence unit configured to cause first laser light, converging along an irradiation direction, to be incident on one surface of the photosensitive substrate; and a second laser light incidence unit configured to cause second laser light, diverging at a plurality of points along an irradiation direction, to be incident on the other surface of the photosensitive substrate.

In the present embodiment, the second laser light incidence unit may include a lens array having one surface on which a plurality of lens portions configured to convert parallel light into diverging light are arranged, and parallel light incident on the lens array may be radiated as the second laser light, which is diverging light, toward the other surface of the photosensitive substrate at the plurality of points through the respective lens portions.

In the present embodiment, a non-light-transmissive mask may be disposed around a region corresponding to each lens portion on a side of the lens array that is opposite to a side where the lens portions are arranged.

In the present embodiment, a distance between centers of the lens portions may be 4 to 6 mm.

In the present embodiment, a focal length of the lens portion may be 2 to 10 mm.

In the present embodiment, a radius of curvature of the lens portion may satisfy the following Equation 1:

$$1/F=(n-1)*(1/R) \qquad \text{<Equation 1>}$$

where F represents the focal length of the lens portion, n represents a refractive index of the lens array, and R represents the radius of curvature of the lens portion.

In the present embodiment, a diameter of the lens portion may be 1 to 3 mm.

An embodiment according to another aspect of the present disclosure provides a method for manufacturing a display lens including a holographic optical element, the method including: a step (a) of causing first laser light, converging along an irradiation direction, to be incident on one surface of a photosensitive substrate in which a substrate is coated with a photosensitive material; and a step (b) of causing second laser light, diverging along an irradiation direction, to be incident on the other surface of the photosensitive substrate while the step (a) is performed, wherein in the step (b), parallel light is incident on a lens array having one surface on which a plurality of lens portions configured to convert parallel light into diverging light are arranged, such that the second laser light is radiated toward the other surface of the photosensitive substrate at a plurality of points through the respective lens portions.

In the present embodiment, the substrate may be a light-transmissive lens.

In the present embodiment, the method may further include a step (c) of stacking the photosensitive substrate subjected to the step (a) and the step (b) and a light-transmissive lens by interposing a light-transmissive adhesive between the photosensitive substrate and the light-transmissive lens, wherein the substrate is a light-transmissive film.

An embodiment according to still another aspect of the present disclosure provides a head-mounted display device including: a display lens manufactured by the method according to an aspect of the present disclosure; and an optical engine configured to cause image light, diverging along an irradiation direction, to be incident on a holographic optical element included in the display lens.

In the present embodiment, an interval between centers of a plurality of exit pupils formed in the display lens may be 4 to 6 mm.

Advantageous Effects

When image light is incident on the reflection holographic optical element, manufactured by the device and method for manufacturing a display lens according to an aspect of the present disclosure, by using the optical engine, a plurality of hologram patterns with different coherence characteristics are recorded at an arbitrary position, and thus a plurality of different light reflection paths may be formed by reflection, thereby making it possible to implement a plurality of exit pupils.

The effects of the present disclosure are not limited to those described above, and effects that are not mentioned may be clearly understood by those skilled in the art from the present specification and the accompanying drawing.

BRIEF DESCRIPTION OF DRAWINGS

(a) of FIG. 3 is a view schematically illustrating a side cross-section of a portion of a lens array according to an embodiment in which a lens portion has a convex shape, and (b) of FIG. 3 is a view schematically illustrating a side cross-section of a portion of a lens array according to another embodiment in which a lens portion has a concave shape.

MODE FOR INVENTION

The present disclosure will become apparent from embodiments to be described below in detail together with the accompanying drawings. However, the present disclosure is not limited to embodiments to be described below, but may be implemented in various different forms, these embodiments will be provided only in order to make the present disclosure complete and allow those skilled in the art to completely recognize the scope of the present disclosure, and the present disclosure will be defined by the scope of the claims. Meanwhile, terms used in the present specification are for explaining embodiments rather than limiting the present disclosure.

In the present specification, a singular form includes a plural form, unless the context clearly indicates otherwise. Components, steps, operations, and/or elements mentioned by terms "comprise" and/or "comprising" used in the present specification do not exclude the existence or addition of one or more other components, steps, operations, and/or elements. Terms "first", "second", and the like, may be used to describe various components, but the components should not be construed as being limited by these terms. The terms are used only to distinguish one component from another component.

Hereinafter, the present disclosure will be described in detail with reference to the drawings.

Figure 1:
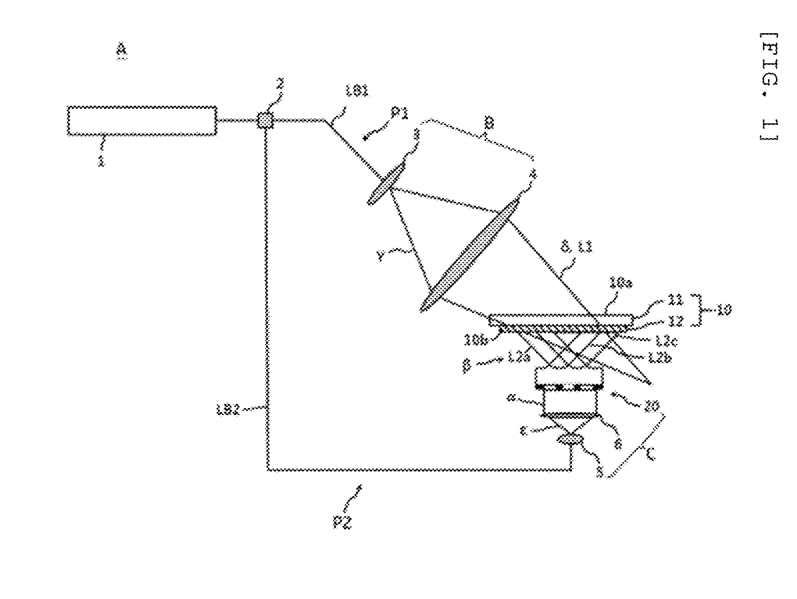
FIG. 1 is a view schematically illustrating a device for implementing a method for manufacturing a display lens according to an aspect of the present disclosure.

FIG. 1 is a view schematically illustrating a device for implementing a method for manufacturing a display lens according to an aspect of the present disclosure.

The method for manufacturing a display lens according to an aspect of the present disclosure is for manufacturing a display lens used in a display device that implements virtual reality or augmented reality, and a display lens including a holographic optical element formed by recording a hologram on a photosensitive substrate through irradiation of two mutually coherent laser beams is manufactured by the method.

The holographic optical element to be formed by using the method according to an aspect of the present disclosure is a reflection holographic optical element which reflects image light, emitted by an optical engine to be incident thereon, by diffraction. The reflection holographic optical element is also called an off-axis reflector, because an incident angle of the image light incident on the holographic optical element and a reflection angle of the image light reflected by the holographic optical element are different from each other.

It is known that such a holographic optical element may be manufactured in a manner in which one surface of the photosensitive substrate is exposed to an object wave and the other surface of the photosensitive substrate that is opposite to the one surface is exposed to a reference wave.

A device A for manufacturing a display lens according to an embodiment of an aspect of the present disclosure may be used to manufacture the display lens including the holographic optical element formed by recording a hologram on a photosensitive substrate 10, in which a substrate 11 is coated with a photosensitive material 12, through irradiation of laser beams.

The device A for manufacturing a display lens may include a first laser light incidence unit B configured to cause a first laser light L1, converging along an irradiation direction, to be incident on one surface 10a of the photosensitive substrate 10, and a second laser light incidence unit C configured to cause a second laser light L2a, L2b, L2c, and the like, diverging at a plurality of points along an irradiation direction, to be incident on the other surface 10b of the photosensitive substrate 10.

The device A for manufacturing a display lens according to an embodiment of the present disclosure may include a laser device 1 that generates laser beams LB and propagates the laser beams LB to the first laser light incidence unit B and the second laser light incidence unit C, respectively. The laser device 1 may include three laser light sources (not illustrated) with light emission wavelengths corresponding to three wavelengths of RGB, and a combiner (not illustrated) that enables coaxial propagation of laser beams output from the three laser light sources, respectively.

The laser beams LB that coaxially propagate by the laser device 1 may be split into two paths by a beam splitter 2 toward the first laser light incidence unit B and the second laser light incidence unit C, respectively.

The first laser light incidence unit B may include a first lens 3 and a second lens 4. A laser beam LB1 in a first path P1 may be converted into diverging light γ whose diameter is increased by the first lens 3 and then be converted into converging light δ by the second lens 4, and the converging light δ may be defined as the first laser light L1 incident on the one surface 10*a* of the photosensitive substrate 10.

The second laser light incidence unit C may include a lens array 20 having one surface on which a plurality of lens portions 22 configured to convert parallel light α into diverging light β are arranged. As the parallel light α is incident on the lens array, the second laser light L2*a*, L2*b*, L2*c*, and the like may be radiated toward the other surface 10*b* of the photosensitive substrate 10 at a plurality of points through the respective lens portions 22.

In addition, the second laser light incidence unit C may further include a third lens 5 and a fourth lens 6. A laser beam LB2 in a second path P2 may be converted into diverging light ε whose diameter is increased by the third lens 5 and then be converted into the parallel light α by the fourth lens 6, and the parallel light α may be converted into the diverging light β and the diverging light β may be radiated at a plurality of points by the lens array 20 as described above. Here, the diverging light β radiated at the plurality of points may be defined as a plurality of second laser light L2*a*, L2*b*, L2*c*, and the like incident on the other surface 10*b* of the photosensitive substrates 10.

In the device A for manufacturing a display lens according to an embodiment of the present disclosure, as the parallel light α is incident on a wide area of a side of the lens array 20 that is opposite to a side on which the lens portions 22 are arranged, the parallel light α is converted into the diverging light β, and the diverging light β is radiated as the plurality of rays of second laser light L2*a*, L2*b*, L2*c*, and the like, at a plurality of points through the respective lens portions 22 on the side on which the lens portions 22 are arranged. Therefore, a region in which the plurality of rays of second laser light L2*a*, L2*b*, L2*c*, and the like overlap one another may be easily formed on the photosensitive substrate 10. As such, in the region in which the plurality of rays of second laser light L2*a*, L2*b*, L2*c*, and the like overlap one another, the first laser light L1 interferes with all the respective rays of second laser light L2*a*, L2*b*, L2*c*, and the like at one arbitrary point, such that a plurality of holograms with different coherence characteristics may be recorded at the point. When predetermined image light is incident on the holographic optical element formed as described above, a plurality of different light reflection paths may be formed by diffraction and reflection by the plurality of holograms with different coherence characteristics, thereby making it possible to easily implement a plurality of exit pupils.

Hereinafter, a process in which the first laser light L1 and the second laser light L2 are incident on the photosensitive substrate 10 will be described.

The method for manufacturing a display lens according to an embodiment of an aspect of the present disclosure includes: a step (a) of causing the first laser light L1, converging along the irradiation direction, to be incident on the one surface 10*a* of the photosensitive substrate 10 in which the substrate 11 is coated with the photosensitive material 12; and a step (b) of causing the second laser light L2*a*, L2*b*, L2*c*, and the like, diverging along the irradiation direction, to be incident on the other surface 10*b* of the photosensitive substrate 10 while the step (a) is performed. In the step (b), parallel light α may be incident on the lens array 20 having one surface on which the plurality of lens portions 22 configured to convert the parallel light α into diverging light β are arranged, such that the second laser light L2*a*, L2*b*, L2*c*, and the like may be radiated at the plurality of points toward the other surface 10*b* of the photosensitive substrate 10 through the respective lens portions 22.

The substrate 11 is coated with the photosensitive material 12 for hologram recording. In the field of hologram, various types of photosensitive materials that may be used to make a copy of the holographic optical element have been publicly known, and such materials may be used in the present disclosure as well without any limitation. Examples of the photosensitive material include a photopolymer, a photoresist, a silver halide emulsion, dichromated gelatin, a photographic emulsion, a photothermoplastic material, and a photorefractive material.

According to an embodiment, the substrate 11 may be a light-transmissive lens. For example, the substrate 11 may be an optically transparent or translucent high reflective glass lens or high reflective plastic lens.

According to another embodiment, the substrate 11 may be a light-transmissive film, that is, an optically transparent film having no anisotropy. For example, the substrate 11 may be a film containing triacetyl cellulose (TAC), polyethylene (PE), polycarbonate (PC), polypropylene (PP), polyamide (PA), polyethylene terephthalate (PET), or the like, but is not particularly limited thereto. In a case where the substrate 11 is a light-transmissive film, the method according to an embodiment of the present disclosure may include a step (c) of stacking the photosensitive substrate 10 and a light-transmissive lens (not illustrated) by interposing a light-transmissive adhesive between the photosensitive substrate 10 and the light-transmissive lens, the photosensitive substrate 10 having the hologram recorded thereon through the step (a) and the step (b). By doing so, a display lens including the holographic optical element may be manufactured.

With the photosensitive substrate 10 in which the substrate 11 that is a light-transmissive lens or light-transmissive film is coated with the photosensitive material 12, the display lens manufactured by the method according to an embodiment of the present disclosure also has a structure through which external light may be transmitted. Therefore, the display lens may be used as a see-through lens that may implement augmented reality.

Figure 2:
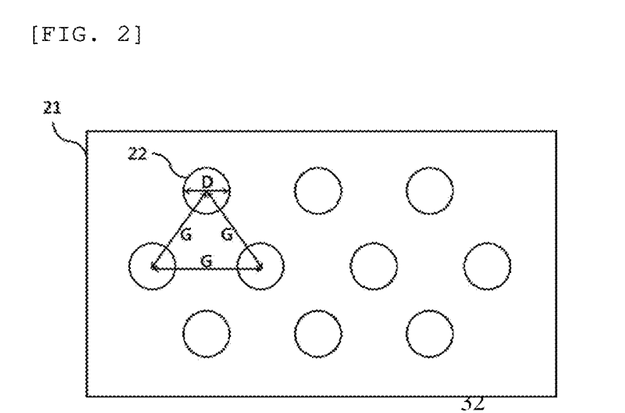
FIG. 2 is a schematic plan view of a lens array used in the method for manufacturing a display lens according to an aspect of the present disclosure.

FIG. 2 is a schematic plan view of the lens array used in the method for manufacturing a display lens according to an aspect of the present disclosure.

The lens array 20 used in the method for manufacturing a display lens according to an embodiment of the present disclosure may include a visible-light-transmissive plate-type base 21 having a predetermined thickness, and the plurality of lens portions 22 formed integrally with one surface of the plate-type base 21, having a concave shape or convex shape, and arranged while being spaced apart from one another. The plate-type base 21 and the plurality of lens portions 22 may be formed of the same material and provided integrally. For example, a material such as optical glass such as BK7 or quartz, normal transparent glass, or transparent plastic may be used.

Figure 3:
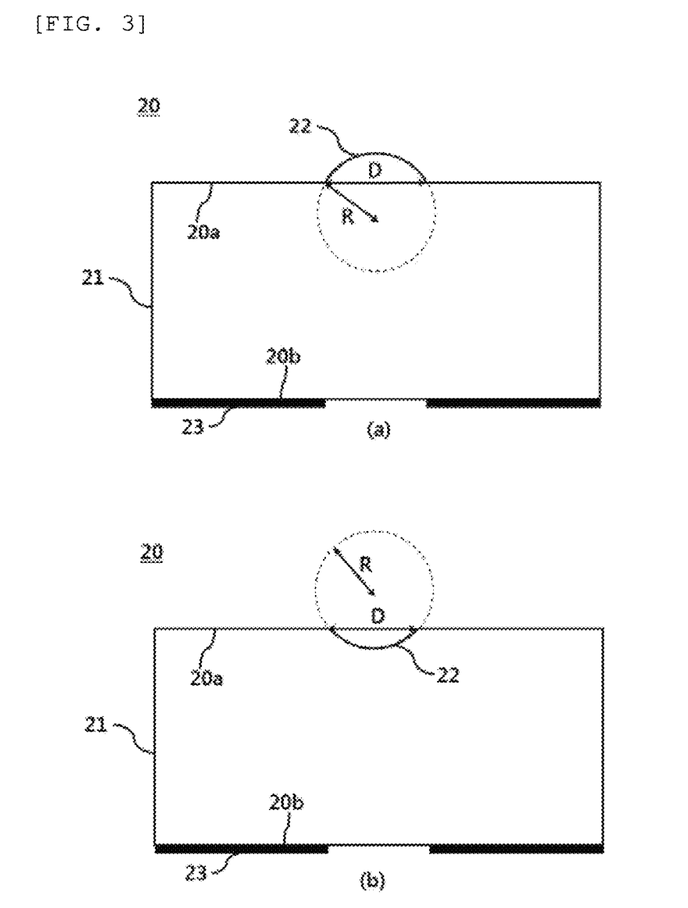

(a) of FIG. 3 is a view schematically illustrating a side cross-section of a portion of the lens array according to an embodiment in which the lens portion has a convex shape, and (b) of FIG. 3 is a view schematically illustrating a side cross-section of a portion of a lens array according to another embodiment in which the lens portion has a concave shape.

A non-light-transmissive mask 23 may be disposed around a region corresponding to each lens portion 22 on a side 20b of the lens array 20 that is opposite to a side 20a on which the lens portions 22 are arranged. The non-light-transmissive mask 23 may be a metal thin film that may block visible light, and a metal such as Cr, Al, or Mo may be used.

Meanwhile, a distance G between centers of the lens portions 22 needs to be the same as or larger than a normal pupil size of a human. The distance G between the centers of the lens portions 22 is preferably 4 to 6 mm. A plurality of rays of second laser light radiated through two adjacent lens portions 22 form an overlapping region on the photosensitive substrate 10 to record a plurality of different holograms at an arbitrary point. However, image light incident on the holographic optical element formed by using the lens array 20 in which the distance G between the centers of the lens portions 22 is smaller than 4 mm may cause a problem in that even when the image light is reflected in a plurality of different light reflection paths, in a case of an image having a predetermined area, all the image light reaches a user's pupil, such that the image looks like multiple images. Meanwhile, image light incident on the holographic optical element formed by using the lens array 20 in which the distance G between the centers of the lens portions 22 is larger than 6 mm is reflected in a plurality of different light reflection paths to form a plurality of exit pupils, but results in a disadvantage in that a region in which the image is not seen according to a position of a wearer's pupil is increased, because the number of exit pupils per unit area is small.

In addition, as described above, the distance G between the centers of the lens portions 22 may correspond to an interval between centers of a plurality of exit pupils formed in the holographic optical element or display lens. Therefore, the interval between the centers of the plurality of exit pupils may also be in a range of 4 to 6 mm. In a case where the interval between the centers of the exit pupils is smaller than 4 mm, a problem may occur in that the image looks like multiple images to the user. In a case where the interval between the centers of the exit pupils is larger than 6 mm, the region in which the image is not seen according to a position of the user's pupil is increased.

Meanwhile, the smaller the focal length F of the lens portion 22, the wider the field of view of the holographic optical element formed by recording through the lens portion 22. That is, the use of the lens portion 22 with a small focal length F facilitates manufacturing of the holographic optical element that implements a wide field of view. The field of view of the holographic optical element may be substantially the same as a divergence angle of the second laser light radiated through the lens portion 22. However, in a case where the focal length of the lens portion 22 is excessively small, a possibility for distortion of the image of the image light reflected by the holographic optical element formed by recording through the lens portion 22 is increased due to aberration of the lens portion 22.

Therefore, in terms of the recording of the holographic optical element for preventing the distortion of the image of the image light reflected by the holographic optical element while securing a predetermined level of field of view, the focal length F of the lens portion 22 is preferably 2 to 10 mm.

In the present embodiment, the radius R of curvature of the lens portion 22 may satisfy the following Equation 1.

$$1/F = (n-1) \ast (1/R) \qquad \text{<Equation 1>}$$

Here, F represents the focal length of the lens portion 22, n represents the refractive index of the lens array 20, and R represents the radius of curvature of the lens portion 22.

In a case where the refractive index n of the lens array 20 is 1.5, and the focal length F of the lens portion 22 is 2 to 10 mm, an appropriate radius R of curvature of the lens portion 22 may be 1 to 5 mm according to Equation 1.

Figure 4:
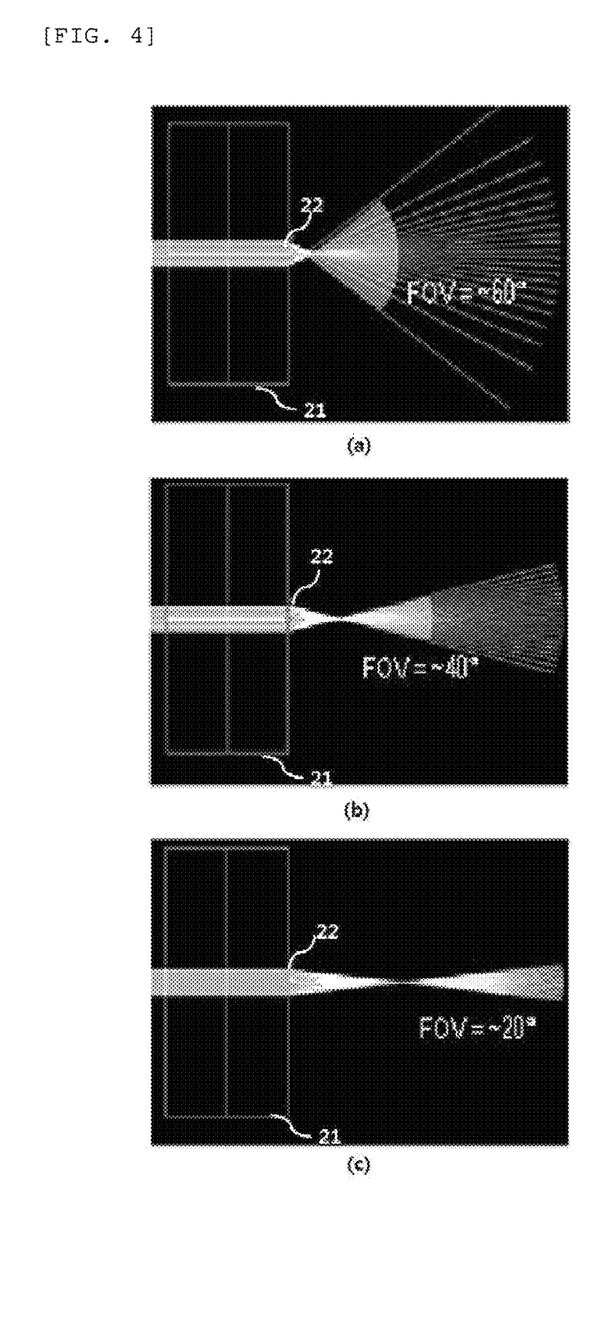
FIG. 4 is a view illustrating results of simulating a focal length and a field of view of a lens portion according to the radius of curvature of the lens portion.

FIG. 4 is a view illustrating results of simulating the focal length and the field of view of the lens portion 22 according to the radius of curvature of the lens portion 22.

It is assumed that a refractive index of each of the lens portion 22 that is a simulation target and the lens array 20 is 1.52.

(a) of FIG. 4 illustrates a case where the radius of curvature of the lens portion 22 is 1.5 mm, in which the focal length F of the lens portion 22 was calculated as about 2.9 mm, and the field of view (FOV) of the lens portion 22 was calculated as about 60° according to Equation 1.

(b) of FIG. 4 illustrates a case where the radius of curvature of the lens portion 22 is 2.5 mm, in which the focal length F of the lens portion 22 was calculated as about 4.8 mm, and the field of view (FOV) of the lens portion 22 was calculated as about 40° according to Equation 1.

(c) of FIG. 4 illustrates a case where the radius of curvature of the lens portion 22 is 5 mm, in which the focal length F of the lens portion 22 was calculated as about 9.6 mm, and the field of view (FOV) of the lens portion 22 was calculated as about 20° according to Equation 1.

Meanwhile, in the description of the present disclosure, the term "diameter of the lens portion" may refer to a diameter D of the lens portion 22 measured when viewed from above the plate-type base 21 or a diameter D of an exposed region that is not blocked by the non-light-transmissive mask 23.

In the present embodiment, the diameter D of the lens portion 22 may be 1 to 3 mm. The diameter D of the lens portion 22 may be determined in consideration of the distance G between the centers of the lens portions 22. For example, the distance G between the centers of the lens portions 22 may be 4 to 6 mm, and in a case where the diameter D of the lens portion 22 is 4 mm or more, the respective lens portions 22 may be in contact with each other or overlap each other and thus may not function as independent lens portions 22, which is problematic. Further, in a case where the diameter D of the lens portion 22 is larger than 3 mm, fabrication may become difficult in consideration of the radius of curvature of the lens portion 22. In a case where the diameter D of the lens portion 22 is smaller than 1 mm, the exposed region that is not blocked by the non-light-transmissive mask 23 is significantly decreased, and thus the area of the second laser light radiated through the lens portion 22 is also decreased, which causes deterioration in hologram recording efficiency.

Figure 5:
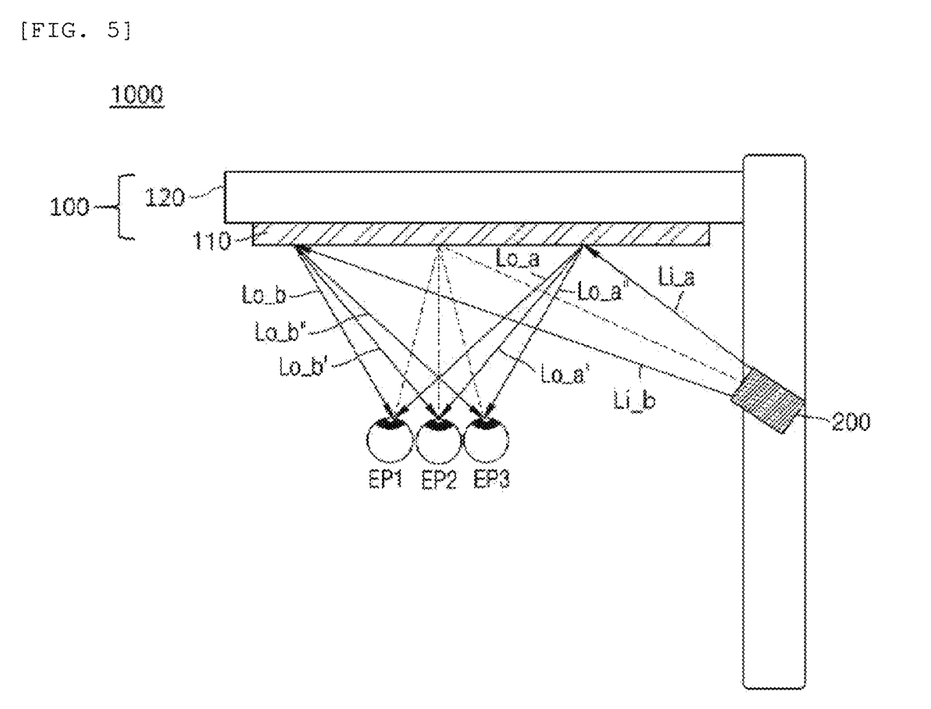
FIG. 5 is a view illustrating an example of a head-mounted display device according to another aspect of the present disclosure.

FIG. 5 is a view illustrating an example of a head-mounted display device according to another aspect of the present disclosure, specifically, a view schematically illustrating only a portion applied to the right pupil of the wearer.

A head-mounted display device 1000 according to another aspect of the present disclosure may include a display lens 100 manufactured by the method according to an aspect of the present disclosure, and an optical engine 200 configured to cause image light, diverging along an irradiation direction, to be incident on a holographic optical element 110 included in the display lens 100.

According to an embodiment, the holographic optical element 110 may be formed by recording a hologram on a photosensitive substrate in which a light-transmissive film is coated with a photosensitive material. In this case, the holographic optical element 110 may be bonded to a lens 120 to form the display lens 100.

According to another embodiment, the holographic optical element 110 may be formed by recording a hologram on a photosensitive substrate in which the lens 120 is coated with a photosensitive material. In this case, the lens 120 and the holographic optical element 110 formed by the recording on the photosensitive material may be stacked to form the display lens 100.

In a case where the lens 120 is a light-transmissive lens formed of transparent glass or polymer resin, external light may be transmitted as it is. Therefore, a wearer of the head-mounted display device 1000 may recognize an object, a background, and the like of the natural world as they are, and light input through the optical engine 200 may be diffracted in a manner of being reflected by the reflection holographic optical element 110, such that the wearer may see the light displayed as a virtual image floating on the object, the background, and the like of the natural world.

The optical engine 200 is a device configured to cause diverging image light to be incident on the holographic optical element 110 in the display lens 100 manufactured by the method according to an aspect of the present disclosure, and a display device such as a laser beam scan projector, a liquid crystal display (LCD), or an organic light emitting diode (OLED) may be used.

Here, when manufacturing the display lens 100 by the method according to an aspect of the present disclosure, RGB wavelengths of first laser light and second laser light and incident angles of the first laser light and the second laser light with respect to the photosensitive substrate 10 may be adjusted by considering conditions such as RGB wavelengths used in the optical engine 200 according to another aspect of the present disclosure, a position of the optical engine 200, and a divergence angle of image light output through the optical engine 200. For example, an R wavelength used in the optical engine 200 may be selected from a range of 620 to 660 nm, a G wavelength may be selected from a range of 520 to 560 nm, a B wavelength may be selected from a range of 440 to 470 nm, the incident angle of the image light output through the optical engine 200 with respect to the holographic optical element may be selected from a range of 40° to 70°, and the divergence angle of the image light may be selected from a range of 20° to 60°.

In the head-mounted display device 1000 according to an embodiment of the present disclosure, holograms with different coherence characteristics are recorded at an arbitrary position of the holographic optical element 110. Thus, when image light Li_a and Li_b is incident on the display lens 100, a plurality of different light reflection paths Lo_a, Lo_a', Lo_a", Lo_b, Lo_b', and Lo_b" may be formed by diffraction and reflection, thereby making it possible to implement a plurality of exit pupils EP1, EP2, and EP3. The larger the number of exit pupils, the larger the size of an eye motion box may be. In the display device 1000, a plurality of exit pupils may be implemented. Thus, even when a position of an actual pupil of each wearer with respect to the display lens 100 varies, a possibility for matching between an actual pupil and an exit pupil may be increased due to the existence of multiple exit pupils, thereby enabling the use for wearers with various body conditions, which is advantageous.

Figure 6:
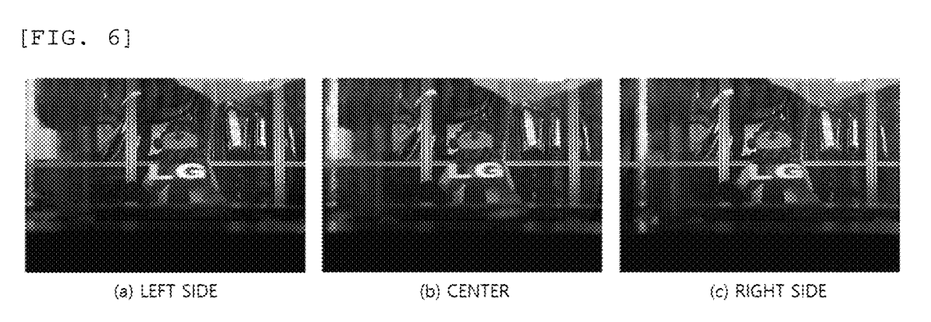
FIG. 6 is a view showing a plurality of exit pupils formed in the display lens according to an aspect of the present disclosure.

FIG. 6 is a view showing an effect obtained by the plurality of exit pupils implemented in the head-mounted display device 1000 according to an embodiment of the present disclosure. FIG. 6 shows pictures of an image that the user can visually recognize by using the head-mounted display device 1000 implemented according to an embodiment of the present disclosure, and it may be seen that a clear image is implemented without a problem in that the image looks like multiple images or a region in which the image is not seen is generated even when the position the pupil is changed to the left side (a), to the center (b), and to the right side (c) on assumption that a position of the pupil of the actual user is changed.

Although the present disclosure has been described in relation to the preferred embodiments described above, various corrections or modifications can be made without departing from the subject matter and scope of the present disclosure. Therefore, the appended claims will include such corrections or modifications as long as they belong to the subject matter of the present disclosure.

The invention claimed is:

1. A device for manufacturing a display lens including a holographic optical element formed by recording a hologram on a photosensitive substrate, in which a substrate is coated with a photosensitive material, through irradiation of laser beams, the device comprising:
   a first laser light incidence unit configured to cause a first laser light, converging along a first irradiation direction, to be incident on a first surface of the photosensitive substrate; and
   a second laser light incidence unit configured to cause a second laser light, diverging at a plurality of points along a second irradiation direction, to be incident on a second surface of the photosensitive substrate, the second surface being opposite from the first surface,
   wherein the second laser light incidence unit includes a lens array having a top surface on which a plurality of lens portions configured to convert parallel light into diverging light are arranged, the device being configured such that the parallel light incident on the lens array is radiated as the second laser light, which is diverging light, toward the second surface of the photosensitive substrate at the plurality of points through the respective lens portions.

2. The device according to claim 1, wherein a non-light-transmissive mask is disposed outside of a region underlying each lens portion on a bottom surface of the lens array that is opposite to the top surface.

3. The device according to claim 1, wherein a distance between centers of adjacent ones of the plurality of lens portions is 4 to 6 mm.

4. The device according to claim 1, wherein a focal length of each of the plurality of lens portions is 2 to 10 mm.

5. The device according to claim 4, wherein a radius of curvature of each of the plurality of lens portions satisfies the following Equation:

$$1/F=(n-1)*(1/R) \qquad \text{<Equation 1>}$$

where F represents the focal length of the lens portion, n represents a refractive index of the lens array, and R represents the radius of curvature of the lens portion.

6. The device according to claim 1, wherein a diameter of each of the plurality of lens portions is 1 to 3 mm.

7. A method for manufacturing a display lens including a holographic optical element, the method comprising:

a step (a) of causing a first laser light, converging along a first irradiation direction, to be incident on a first surface of a photosensitive substrate in which a substrate is coated with a photosensitive material; and a step (b) of causing a second laser light, diverging along a second irradiation direction, to be incident on a second surface of the photosensitive substrate while the step (a) is performed, the second surface being opposite from the first surface, wherein during the step (b), parallel light is incident on a lens array having a top surface on which a plurality of lens portions configured to convert the parallel light into diverging light is arranged, such that the second laser light is radiated toward the second surface of the photosensitive substrate at a plurality of points through respective ones of the plurality of lens portions.

8. The method according to claim 7, wherein the substrate is a light-transmissive lens.

9. The method according to claim 7, further comprising a step (c) of stacking the photosensitive substrate and a light-transmissive lens by interposing a light-transmissive adhesive between the photosensitive substrate and the light-transmissive lens, wherein the photosensitive substrate is a light-transmissive film.

10. A head-mounted display device comprising:

the display lens manufactured by the method according to claim 7; and an optical engine configured to cause image light, diverging along a third irradiation direction, to be incident on a holographic optical element included in the display lens.

11. The head-mounted display device according to claim 10, wherein an interval between centers of adjacent ones of a plurality of exit pupils formed in the display lens is 4 to 6 mm.

\* \* \* \* \*